United States Patent

[11] 3,607,319

| [72] | Inventor | Robert K. Scott<br>Pittsburgh, Pa. |
| --- | --- | --- |
| [21] | Appl. No. | 804,649 |
| [22] | Filed | Mar. 5, 1969<br>Continuation-in-part of Ser. No. 611,168, Jan. 23, 1967 and Ser. No. 525,222, Feb. 4, 1966, abandoned. |
| [45] | Patented | Sept. 21, 1971 |
| [73] | Assignee | Avnet, Inc.<br>Plainview, N.Y. |

[54] PROCESS FOR MAKING REFRACTORY MOLDS
8 Claims, No Drawings

[52] U.S. Cl.................................................. 106/38.35,
106/57, 106/69
[51] Int. Cl.................................................. B28b 7/34
[50] Field of Search.......................................... 106/38.3,
38.35, 57, 69, 38.2; 117/100 S, 100 I

[56] References Cited
UNITED STATES PATENTS

| 2,926,098 | 2/1960 | Ilenda et al. | 106/38.35 |
| --- | --- | --- | --- |
| 3,226,784 | 1/1966 | Owen et al. | 164/36 |
| 3,232,771 | 2/1966 | Pearce | 106/38.35 |
| 3,428,465 | 2/1969 | McLeod | 106/38.35 |

*Primary Examiner*—Lorenzo B. Hayes
*Attorneys*—Richard P. Crowley, Philip G. Kiely and Richard L. Stevens ABSTRACT: A refractory mold is prepared from a prehydrolyzed organic silicate and a particulate refractory material having a coating prepared from an air-stable organic base, water and a water-soluble polyhydric alcohol or an ester thereof.

PROCESS FOR MAKING REFRACTORY MOLDS

This application is a continuation-in-part of copending application Ser. No. 611,168, filed Jan. 23, 1967, and application Ser. No. 525,222, filed Feb. 4, 1966 (now abandoned).

BACKGROUND OF THE INVENTION

This invention relates to the manufacture of refractory molds and to the refractory materials for making such molds. More particularly, the invention relates to the process for preparing the materials for making investment and other types of molds, the materials for making molds generally used for metal casting, and to the processes of using such materials in making molds.

Precision castings of metal and other types of material cast in the molten state are used in many industries and, generally, such castings are made in expendable molds, and these may be classified as the lost wax, the single investment, and the double investment processes. These all have one thing in common: They are one-use molds, in which the mold is generally destroyed in removing the casting from it. To provide an economical process, a master mold or pattern is initially prepared, from which a plurality of the one-time use refractory molds are made by one of the above processes. The materials for preparing such molds generally include a refractory and a binder. The art of preparing these materials for the molds has heretofore required precision techniques and highly trained personnel in the art of mixing the materials and preparing the expendable molds.

Most generally, the preparation of a binder was the critical part of the process, as it had to be carefully and critically prepared according to a most precise recipe. One commonly used type of binder included a mixture of an alcohol, and acid substance, and an organic silicate, sometimes with additional ingredients. To provide proper binding, to prevent separation of the liquid ingredients of the binder, and to prevent formation of gas bubbles and the like, considerable care was required by the highly skilled artisans, not only in preparation of the materials but in the actual making of the molds.

In U.S. Pat. No. 3,226,784, a process is taught to coat the refractory grains with a gelling agent prior to its reaction with a binder solution. The grains are mixed with the gelling agent which is dissolved in an organic solvent. The solvent is then evaporated leaving refractory grains coated with a uniform thin coating of gelling material on essentially each of the refractory particles. The treated refractory grains and binder solution are placed in the master mold and, after reaction, there is formed a uniform gel throughout the mass of the mold. This provides means for accurately controlling the gel time to thereby produce relatively good results in the formation of expendable working molds in which molten metal or the like is to be cast. The above method has proved to be satisfactory. However, improvement has seemed desirable in certain aspects. In one respect, it was found that because of the solubility characteristics in the solvents many organic bases, especially amine carbonates could not be employed. Further, it was found that while certain of the free amines were soluble in binder solvents and promoted rapid gelation, such amines could absorb carbon dioxide from the atmosphere and show effects similar to those that would be found if an amine carbonate was used initially, i.e., reduced reactivity with respect to gelation.

In practice, the coated refractory grains may be stored for relatively long periods of time under varying climate conditions. While the above-described coated grains have a relatively long storage life under normal storage conditions, it has been found that the gelling agent on the grains tends to decompose after long periods of storage under adverse weather conditions particularly in warm weather. Also, under some conditions the initial gel time is excessively short. In addition, it has been discovered that under certain conditions, when the coated grains are reacted with an alcohol binder solution to provide for gelation, the alcohol evaporates too rapidly causing cracks and so forth in the mold walls. The phenomenon of alcohol evaporation from the exposed surfaces also resulting in the shrinkage of the surfaces, thus introducing distortion into the mold. In the so-called Shaw Process of forming investment molds, the surface of the refractory is immediately "torched" to burn off the alcohol and thus form the desired microcrazing in the surface.

Still another method to avoid the undesirable or uncontrolled loss of alcohol is described in U.S. Pat. No. 3,213,497 wherein the mold, as soon as the master pattern is removed therefrom, is immediately covered with an air and alcohol impervious barrier so as to retard the evaporation of alcohol from the mold.

However, both of these methods involve a physical treatment of the mold upon removal of the master pattern. The precise extent to which any alcohol evaporation occurs depends upon the speed and technique employed in either torching the mold or applying the covering thereto and which, of course, will vary with the individual operator as well as other factors.

OBJECTS OF THE INVENTION

Accordingly, an object of the present inventions is to provide a novel refractory material for forming molds which includes refractory grains, substantially all of which are coated with a very thin layer of the precursor of a gel dissolved in a vehicle designed to overcome the difficulties heretofore encountered.

Another object of the invention is to provide a refractory material coated with the precursor of a gel for refractory molds, which coated refractory material has a relatively long storage life under substantially all storage conditions.

A further object of the invention is to provide a refractory material which is usable in a process for producing refractory molds economically, and which produces uniform molds under controlled conditions of time. A still further object of the invention is to provide a refractory material comprising grains of refractory material essentially each of which has a very thin coating of the precursor of a gel, which produces a uniform gel in a mold regardless of the shape of the mold and which provides means for predetermining the gelling time of the refractory binder mixture in the mold.

A further object of the invention is to provide a refractory mold initially formed of particulate refractory in a gel ready for firing, wherein the precursor of the gel has excellent stability, good control of the gel characteristics is maintained, and the mold has excellent green and final strength.

A still further object of the invention is to provide a process for producing refractory molds.

These and other objects of the advantages of the invention may be ascertained by referring to the following description, which is intended merely as illustrative and not limiting on the spirit or the scope of the invention.

SUMMARY OF THE INVENTION

According to a broad aspect of the present invention, there is provided the materials for fabricating mold parts. The particles of a refractory are coated with a thin layer of a residue from a solution composed of (1) one of the classes of an organic base, acid addition salts thereof, said acids being weak acids, said salts retaining acid neutralizing properties and alkali metal and alkaline earth salts of said weak acids; (2) one of the class of a water soluble polyhydric alcohol and a water soluble ester of a polyhydric alcohol and a low molecular weight organic acid; and (3) a small but effective amount of water.

The employment of the water soluble polyhydric alcohol permits the use of organic bases or alkaline salts thereof which would normally be too sparingly soluble or insoluble in alcohol to be of use in preparing the coating solution for the refractory grains. As examples of such sparingly soluble organic bases, mention may be made of guanidine carbonate and other amine carbonate known to the art.

It has been found that immediate ignition of the mold or enclosing the mold in an alcohol barrier is no longer necessary since the novel composition of the present invention reduces the loss by evaporation of alcohol from the mold surface to the extent that the aforementioned physical methods of alcohol-loss inhibition are no longer necessary.

More surprisingly, it has been found that the strength of the mold in both the green and fired state are increased by virtue of the novel coating composition of the present invention. This is quite surprising in view of the prior art which showed that the use of polyhydric alcohols, in different composition, provided improved *collapsibility* rather than higher final strength (see Illenda et al., U.S. Pat. No. 2,926,098)

DETAILED DESCRIPTION OF THE MOLDS

The refractory grains, which may be used for making the molds, may be substantially any conventionally used refractory material, including metal oxide refractory grain which is chemically inert to the molten metal and other similar materials which may be cast in the mold. Examples of satisfactory grain include alumina (99.9 percent $Al_2O_3$, by weight, on the basis of an oxide analysis), calcined clay (analyzing mostly $SiO_2$ and $Al_2O_3$, on an oxide basis), mullite, silica, less pure alumina, "Alundum" (a proprietary fused corundum material), sillimanite, various spinel materials, such as chrome ore, zirconia (preferably stabilized zirconia), etc. The refractories used for making such molds are usually carefully screened, so as to provide a uniform product. For many purposes, the grains may generally be of a size so that about 20–50 percent is in the −6 +30 mesh range, the remainder being mostly in the −30 +200 mesh range, with 30–50 percent passing 200 mesh (all sizes, U.S. Standard series of screens). Other sizes may be used to meet the requirements of a particular problem.

The organic base is of the amine type or a salt thereof, including alkylamines having from 2–22 carbon atoms, preferably in the range of from 2–10 carbon atoms, and other bases as set out below. The organic bases resist polymerization and are essentially inert to the organic solvent in which they are dissolved. The organic base reacts with acid in a fluid binder, increasing the pH from about 2 to about 4–7 preferably substantially neutral, and causing gelation of the binder material. One criteria of the base, which is critical, is its stability in air at ambient temperatures. The organic base must be stable in air, and have a sufficiently low vapor pressure at ambient temperatures to permit a reasonable storage life when incorporated in the refractory material. When the organic bases are liquid or semiliquid, they should have a vapor pressure of about 10 mm. of Hg. or less at 760 mm. pressure. These organic bases, preferably, are solid or semisolid at about room temperature and normally, should be solid or soapy in a temperature ranging from about 70-160° F. Examples of the amines include mono-, di-, and tri-alkyl-substituted amines. Certain ring compounds having an incorporated nitrogen atom are basic in characteristics and are, therefore, usable, including pyridines, quinolines, alkyl-substituted quinolines. Also usable are primary, secondary, and tertiary amines, and certain other mono-, di-, and tri-amines, and which have straight alkyl chains, or a combination of the alkyl or aliphatic chain and cyclic compounds, for example, dimethylphenylamines.

Certain basic organic amine compounds containing nitrogen may also be used, and these include such as purine, etc. The selected amine must be at least weakly basic.

Alkaloids are, also, capable of causing gelation; however, cost is a limiting factor to their use. Solid quarternary ammonium compounds, which are strong bases capable of neutralizing the acid of the fluid binder, may be used as gelling agents for coating the refractory grain. Other organic bases having a sufficiently low vapor pressure at atmospheric pressure useful for carrying out our invention include diethylamino propylamine, diethylene triamine, triethylene tetramine, tetraethylene pentamine, imino-bispropylamine, dibutyl amine, 2-ethylhexyl amine, di(2-ethyehexyl) amine, etc. In all instances the compositions are basic, stable and have a low vapor pressure at storage temperatures and pressures. The organic base or salt thereof is one having a dissociation constant ($k_b$) in the range of from $1\times10^{110}$ to $1\times10^{12}$ and preferably $1\times10^{16}$ to $1\times10^{12}$. The dissociation constant is expressed as the product of the concentrations of the ammonium derivative and hydroxide ions divided by the total concentration of the ionizable amine material. The basic strength of the amine is conveniently expressed as the negative logarithm of the basic dissociation constant. Such basic materials must, also, be water soluble at least to the extent to which they are present.

The polyhydric alcohol is dissolved in the solution of the organic base and water and becomes a part of the coating on the refractory particles. The polyhydric alcohol increases the stability of the base and prevents its decomposition, particularly in warm weather. With some bases, the polyhydric alcohol reduces water loss from the base (where water is initially present) preventing decomposition and substantially maintaining the desired gel time. However, it is not the property of these materials to restrict water loss which is employed in the present invention. In fact, water loss is not a problem in the refractory material used in preparing the material of the present invention. Only a small quantity of water is used in preparing the composition for coating on the grains. For some bases an aqueous solution or organic solvents may be used, e.g. alkyl amines in water-ethyl alcohol solutions with a small percent of a polyhydric alcohol. The amount of polyhydric alcohol present should be sufficient to provide the benefits set out above, and generally, may extend from about 0.01 percent to about 5.0 percent by weight of the refractory, and preferably it is in the range of about 0.05 to 2.0 percent. Such polyhydric alcohols as glycerol, ethylene glycol, 1, 2, 6-hexanetriol, propylene glycol, diethylene glycol, and butylene glycols (butane-diols), the amylene glycols (the pentanediols), the hexanediols, pinacol, triethylene glycol, etc. may be used in accordance with the invention. Ethylene glycol and glycerol are two of the preferred polyhydric alcohols because of their ready availability and inexpensiveness. Both function excellently to increase stability of the base, maintain gel time and give good green and fired strengths of the mold. Water soluble esters of polyhydric alcohols and low molecular weight organic acids may be used in place of the polyhydric alcohol, e.g. glycol monoacetate, and preferably the esters are part esters rather than fully esterified alcohols. Certain polyhydric alcohols which are crystalline may be used, including erythritol, arabitol, etc. Preferred alcohols or esters are liquid at ambient temperatures.

In any event, the controlling parameters for the selected polyhydric alcohols or esters include the following: It must not precipitate in the presence of the organic solvent of the binder solution. It must not change the pH of the mixture of binder solution and the selected basic organic gelling agent from the desired, substantially neutral condition. It must be compatible with, i.e. soluble, in a water system.

The quantity of polyhydric alcohol used can be expressed in at least two ways. One is given above. Another is to state, preferably, it is present in a quantity from one to four times the concentration of the organic base.

A satisfactory range for water in the system of the present invention is 0.2 to 2.0 percent, by weight based on the weight of the refractory. Less water can make the mix too dry and gelation difficult.

The refractory grains are coated by treating them with the organic base dissolved in a mixture of water and a polyhydric alcohol, such as glycerol, ethylene glycol, 1, 2, 6-hexanetriol, or the like, to produce a weak solution of the base in the mixture. The base may run from 1 to about 25 percent of the treating solution. The amount of organic base material per pound of the refractory grains is carefully controlled, and may run from 0.05 percent to about 2 percent of the weight of the refractory depending on the base selected. A satisfactory amount extends from about 0.1 percent to about 1 percent, by weight, of the base, while the preferred range is 0.1 to 0.7 percent. After the grains are treated with the solution, they are prepared for storage or immediate use.

Immediately prior to forming a mold the treated refractory is slurried with a gelling binder. The resultant mixture of ingredients must be substantially neutral. Therefore, the amount of the amine ingredient must be sufficient to substantially neutralize the acid in the binder. A prehydrolyzed ethyl silicate in alcohol is a preferred binder; however, other alkyl silicates or other binders which gel on the addition of alkaline substances can be used to form the slurry, such binders are common in the prior art. After the slurry is formed, it is poured about the master and permitted to gel. When sufficient set has developed, the green mold body may be removed; and it may be fired up to a temperature of about 2000° F., where desired, to obtain some ceramic bonding and, thus, more strength.

Merely by way of example, a calcined flint clay product of commerce, manufactured by the Harbison-Walker Refractories Company and termed "FLINTMULL GG3", mullite and mixtures thereof, are used as the refractories in the following tests. The "FLINTMULL GG3" is a mixture of calcined flint clay and mullite grain. The mullite is calcined Alabama bauxite, which has been heated to a temperature sufficient to induce extensive reaction between the contained alumina and silica to obtain mullite crystals. Usually, in mixtures of the foregoing, the mullite comprises the −70 mesh fraction. These two refractories are screened on U.S. Standard screens, to obtain about the following exemplary screens:
(approximate but typical)
Passing a 6 and held on a 12 mesh screen—10 percent
Passing a 12 and held on a 30 mesh screen—10 percent
Passing a 30 and held on a 200 mesh screen—40 percent
With any remaining material passing a 200 mesh screen.

The −200 mesh fraction may be on the order of 40 percent, by weight.

The sized refractory grain is sprayed while mixing or tumbling so as to contact it with a solution of the organic base in a mixture of water and a polyhydric alcohol or ester to uniformly coat substantially all the particles.

Example I

A solution of diethylenetriamine in a mixture of glycerol and water is sprayed on tumbling refractory particles. This refractory grain mixture is about as follows: a refractory consisting essentially of 20 percent −8 on 30 mesh calcined flint clay, the balance being −100 mesh mullite. The mixing is accomplished in a concrete mixer or equivalent, to provide for uniform distribution of the solution throughout the refractory. The amount of solution is predetermined or precalculated to add the requisite amount of base material to the weighed refractory. After substantially all of the solution is sprayed or placed on the refractory grains and thoroughly mixed, the grains are removed. This provides a thin residual film or coating of solution on the refractory surfaces.

For Example I the solution for coating the refractory is made up as a solution of diethylenetriamine in a mixture of 10 parts glycerol and 90 parts water and sufficient solution is added to the refractory to provide about 0.2 percent of the amine based on the weight of the refractory. Since the amount of refractory grain determines the amount of amine and glycerol required, for convenience, the solution is made up as percentage of the refractory. Thus, the solution, based on the weight of refractory, contains, roughly, about 0.20 percent diethylenetriamine, about 1.59 percent distilled water and about 0.18 percent glycerol. This can be considered a preferred embodiment.

The coated refractory is slurried with a solution of prehydrolyzed ethyl silicate in ethyl alcohol and a small amount of hydrochloric acid. It is preferred that about 100 cc. of the solution be provided for each pound of coated grain. The binder solution contains about 18 percent $SiO_2$, by weight, derived from ethyl silicate (40 percent $SiO_2$ content) and sufficient water to permit about 83 percent hydrolyzation in ethyl alcohol. Hydrochloric acid (about 1 cc. per 100 cc. of solution) is added to reduce the solution to about pH 2. The slurry was poured into a mold. The gel time was about 8 minutes. The cold crushing strength (CCS), after 45 minutes, was 115 p.s.i. After firing at 1800° F. for about 3 hours the mold had a CCS of about 450 p.s.i. This compares to a standard mold having 0.15 percent of Duomeen C (a coconut oil derivative of 1,3-propylenediamine) coated refractory, which had a gel time of 6½ minutes, a green CCS of 70 p.s.i. and a fired CCS of 280 p.s.i.

Example II

The procedure of Example I in which glycol is substituted for glycerol. The glycol is present in a quantity of about one to four times the concentration of the diethylene triamine.

Example III

The process of Example I in which the polyhydric alcohol is erythritol in a concentration one to four times that of the diethylenetriamine.

Example IV

The process of Example I in which arabitol is the polyhydric alcohol used and is present in a quantity from one to four times the concentration of the diethylenetriamine.

Example V

Any of the processes of Examples I through IV in which the amine is 1,3-propylenediamine.

Example VI

The process of Example I in which the alcohol is glycol monoacetate.

By varying the amount of the organic base per pound of refractory, the gel times may be changed; for example, from about 2½ minutes to over 20 minutes, and longer, if desired. The longer gel times are considered somewhat undesirable, in that gelled materials remain too rubbery for successful removal of the mold from the pattern even after a substantial period of time. Removal of the pattern appears to be most successful after about 2–5 times the gel time of a particular mix. Preferred practice is removal after about three times the gel time of the particular mix. The actual time elapsed is, of course, dependent on the gel time. For example, if a mix gels in 1 minute, waiting 3–5 minutes is satisfactory for removal of the mold from the pattern. If the gel time is on the order of one-half hour, however, a set of 2½ hours could cause some difficulty in removing the cast article from the master pattern. Gel completion can be determined by finger pressure; for example, the material just begins to resist pressure and does not flow.

Temperature has an effect on the gelling time. The time required for gelation is reduced by higher temperatures. Additionally, gel time can be decreased by addition of small amounts of distilled water to the prehydrolyzed ethyl silicate solution. Where the gel time is too short, as a result of high temperature or long mixing and pouring time, it can be increased by the use of a portion of untreated refractory material, which, in effect, reduces the amount of gelling agent present per unit weight of refractory.

The prehydrolyzed ethyl silicate solution is a mixture of (1) ethyl silicate (40 percent $SiO_2$ is a preferred embodiment) in (2) ethyl alcohol with a small amount of (3) water and a small amount of (4) an acid, usually hydrochloric or sulphuric.

By using the materials and process of the invention, persons with little technical acumen can readily mix the mold materials in the field without elaborate equipment or techniques. The prepared grains may be roughly measured, as, for example, so many quarts of the base treated grains which are shipped, prepared and bagged and stored near the point of use. The binder may, also, be roughly measured; for example, so many pints of the solution. The two components are then mixed to form a slurry, which is poured into the master pattern. After gelling to final set, the mold is removed. For some molds, vibration may be necessary to prevent entrapping of air bubbles, etc.

The preparation of some preferred binder solutions for the present invention are disclosed and claimed in copending application, Ser. No. 223,623, filed Sept. 14, 1962, by William H. Owen.

While the invention has been illustrated by specific examples, there is no intent to limit the spirit or scope of the invention, except as defined in the following claims:

1. In the process of preparing a refractory mold which mold is the reaction product of a slurry comprising a particulate refractory material, an acidic prehydrolyzed alkyl silicate and a solvent and which contains an organic base as a gelling agent, said organic base being essentially nonvaporous and having a vapor pressure of not greater than about 10 millimeters of mercury at 760 millimeters pressure, having a dissociation constant of from about $1 \times 10^{10}$ to $1 \times 10^{12}$ and having a melting point of from about 70° to 160° F. the improvement which comprises:
   a. preparing a liquid coating solution which comprises, based on the weight of the particulate refractory material to be coated, from about 0.2 to 2.0 percent by weight of water and from about 0.01 to 5.0 percent by weight of material selected from the class of water soluble polyhydric alcohols and a water soluble organic acid ester thereof and from 0.05 to 2 percent of said organic base, the organic base employed being soluble in said liquid coating composition;
   b. coating uniformly substantially all of the individual grains of the particulate refractory material to be employed in forming the refractory mold with said coating solution on the refractory particulate surfaces, thereby providing particulate refractory material in which the soluble organic base in the thin-film coating is inhibited from reacting with the air and suitable for long term storage prior to use; and
   c. incorporating said liquid-coated particulate refractory material into a prehydrolyzed alkyl silicate solvent slurry, gelling the slurry about a pattern, and firing the gelled mold obtained so as to provide a refractory mold characterized by a microcrazed structure means, the refractory mold so formed exhibiting increased green and final mold strength.

2. The method of claim 1 wherein the amount of said organic base is from 0.1 to 1 percent.

3. The method of claim 1 wherein the organic base is an amine having from 2 to 22 carbon atoms.

4. The method of claim 1 wherein the polyhydric alcohol employed is selected from the group consisting of glycerol, ethylene glycol, 1, 2, 6-hexanetrial, propylene glycol, diethylene glycol, butylene glycols, amylene glycols, hexanediols, triethylene glycol, erythritol, arabitol and glycol monoacetate.

5. The method of claim 1 wherein the organic base is selected from the group consisting of diethylamino propylamine, diethylene triamine, triethylene tetramine, tetraethylene pentamine, imino-bispropylamine, dibutyl amine, 2-ethylhexyl amine, di(2-ethylhexyl)amine, 1,3-propylenediamine and amine carbonates.

6. The method of claim 1 wherein the coating of the particulate refractory material includes spraying the coating solution on tumbling refractory particles.

7. The method of claim 1 which includes slurrying the thin-liquid-coated refractory material into a solution of ethyl silicate in an ethyl alcohol aqueous acidic solution.

8. The particulate refractory material characterized by the residual thin-liquid coating of the coating solution containing said organic base as set forth in claim 1.